(12) United States Patent
Hartelius

(10) Patent No.: US 9,413,287 B2
(45) Date of Patent: Aug. 9, 2016

(54) PHOTOVOLTAIC MODULE SUPPORT SYSTEM

(71) Applicant: First Solar, Inc., Perrysburg, OH (US)

(72) Inventor: John Hartelius, Brick, NJ (US)

(73) Assignee: First Solar, Inc., Perrysburg, OH (US)

( * ) Notice: Subject to any disclaimer, the term of this patent is extended or adjusted under 35 U.S.C. 154(b) by 0 days.

(21) Appl. No.: 14/989,039

(22) Filed: Jan. 6, 2016

(65) Prior Publication Data

US 2016/0118931 A1    Apr. 28, 2016

Related U.S. Application Data

(62) Division of application No. 14/470,151, filed on Aug. 27, 2014, now Pat. No. 9,252,307, which is a division of application No. 13/784,374, filed on Mar. 4, 2013, now Pat. No. 8,844,214, which is a division of application No. 13/011,185, filed on Jan. 21, 2011, now Pat. No. 8,407,950.

(51) Int. Cl.
F24J 2/52 (2006.01)

(52) U.S. Cl.
CPC ...................................... *H02S 20/32* (2014.12)

(58) Field of Classification Search
CPC .... Y02E 10/47; F24J 2/541; F24J 2002/5468; F24J 2/523; F24J 2/5233; H02S 20/32
See application file for complete search history.

(56) References Cited

U.S. PATENT DOCUMENTS

| 1,888,620 A | 5/1927 | Clark |
|---|---|---|
| 4,146,785 A | 3/1979 | Neale |
| 4,184,482 A | 1/1980 | Cohen |
| 4,249,514 A | 2/1981 | Jones |
| 4,345,582 A | 8/1982 | Aharon |
| 4,429,178 A | 1/1984 | Prideaux et al. |
| 4,476,854 A | 10/1984 | Baer |
| 4,512,117 A | 4/1985 | Lange |
| 4,765,309 A | 8/1988 | Legge |
| 4,832,001 A | 5/1989 | Baer |
| 4,995,377 A | 2/1991 | Eiden |
| 4,999,059 A | 3/1991 | Bagno |
| 5,169,456 A | 12/1992 | Johnson |
| 5,228,924 A | 7/1993 | Barker et al. |
| 5,317,145 A | 5/1994 | Corio |
| 5,374,317 A | 12/1994 | Lamb et al. |
| 5,542,409 A | 8/1996 | Sampayo |
| 5,660,644 A | 8/1997 | Clemens |
| 5,730,117 A | 3/1998 | Berger |

(Continued)

FOREIGN PATENT DOCUMENTS

| AU | 2002301463 | 6/2003 |
|---|---|---|
| AU | 2003254387 | 5/2004 |

(Continued)

*Primary Examiner* — Rodney Mintz
*Assistant Examiner* — Daniel Kenny
(74) *Attorney, Agent, or Firm* — Blank Rome LLP

(57) ABSTRACT

A support system for a solar panel includes a triangular truss with connection points for mounting a photovoltaic module, and a cradle structure that supports the triangular truss and is connected to at least two side supports of the triangular truss. The cradle structure may be driven for rotation about an axis for tracking the sun and several cradle structures can be linked together for tracking movement using a buried linkage system. The truss may also be foldable for ease of transportation and storage.

17 Claims, 18 Drawing Sheets

(56) References Cited

U.S. PATENT DOCUMENTS

| | | | |
|---|---|---|---|
| 5,819,492 | A | 10/1998 | Konicek |
| 6,046,399 | A | 4/2000 | Kapner |
| 6,058,930 | A | 5/2000 | Shingleton |
| 6,089,224 | A | 7/2000 | Poulek |
| 6,123,067 | A | 9/2000 | Warrick |
| 6,563,040 | B2 | 5/2003 | Hayden et al. |
| 6,662,801 | B2 | 12/2003 | Hayden et al. |
| 6,870,087 | B1 | 3/2005 | Gallagher |
| 6,959,993 | B2 | 11/2005 | Gross et al. |
| 7,190,531 | B2 | 3/2007 | Dyson et al. |
| 7,192,145 | B2 | 3/2007 | Ealey |
| 7,192,146 | B2 | 3/2007 | Gross et al. |
| 7,240,674 | B2 | 7/2007 | Patterson |
| 7,252,083 | B2 | 8/2007 | Hayden |
| D565,505 | S | 4/2008 | Shugar et al. |
| 7,357,132 | B2 | 4/2008 | Hayden |
| D586,737 | S | 2/2009 | Shugar et al. |
| 7,531,741 | B1 | 5/2009 | Melton et al. |
| 7,554,030 | B2 | 6/2009 | Shingleton |
| 7,557,292 | B2 | 7/2009 | Shingleton et al. |
| 7,647,924 | B2 | 1/2010 | Hayden |
| 7,857,269 | B2 | 12/2010 | Plaisted et al. |
| 7,888,588 | B2 | 2/2011 | Shingleton |
| 8,991,388 | B2 | 3/2015 | Brothersen |
| 9,246,035 | B2 * | 1/2016 | Eaton, Jr. ............. H01L 31/042 |
| 2003/0070705 | A1 | 4/2003 | Hayden et al. |
| 2004/0219039 | A1 | 11/2004 | Watt |
| 2004/0238025 | A1 | 12/2004 | Shingleton |
| 2006/0044511 | A1 | 3/2006 | Mackamul |
| 2006/0054162 | A1 | 3/2006 | Romeo |
| 2007/0012312 | A1 | 1/2007 | Hayden |
| 2007/0019362 | A1 | 1/2007 | Stevenson et al. |
| 2007/0070531 | A1 | 3/2007 | Lu |
| 2007/0215145 | A1 | 9/2007 | Hayden |
| 2008/0000514 | A1 | 1/2008 | Lin et al. |
| 2008/0000515 | A1 | 1/2008 | Lin et al. |
| 2008/0230047 | A1 | 9/2008 | Shugar et al. |
| 2008/0230108 | A1 | 9/2008 | Keshner et al. |
| 2008/0236567 | A1 | 10/2008 | Hayden |
| 2008/0245360 | A1 | 10/2008 | Almy et al. |
| 2008/0245402 | A1 | 10/2008 | Romeo |
| 2008/0251115 | A1 | 10/2008 | Thompson et al. |
| 2008/0264363 | A1 | 10/2008 | Heusser et al. |
| 2008/0264474 | A1 | 10/2008 | Frauenknecht et al. |
| 2008/0283116 | A1 | 11/2008 | Banin et al. |
| 2008/0308091 | A1 | 12/2008 | Corio |
| 2009/0005019 | A1 | 1/2009 | Patel et al. |
| 2009/0007901 | A1 | 1/2009 | Luconi et al. |
| 2009/0031432 | A1 | 1/2009 | Wakai |
| 2009/0032014 | A1 | 2/2009 | Meydbray |
| 2009/0050191 | A1 | 2/2009 | Young et al. |
| 2009/0071154 | A1 | 3/2009 | Penciu |
| 2009/0151769 | A1 | 6/2009 | Corbin |
| 2009/0159075 | A1 | 6/2009 | Mackamul |
| 2009/0188487 | A1 | 7/2009 | Jones et al. |
| 2009/0223142 | A1 | 9/2009 | Shingleton et al. |
| 2009/0223315 | A1 | 9/2009 | Needham |
| 2009/0235975 | A1 | 9/2009 | Shingleton |
| 2009/0260619 | A1 | 10/2009 | Bailey et al. |
| 2009/0283133 | A1 | 11/2009 | Hebrink et al. |
| 2010/0000051 | A1 | 1/2010 | See |
| 2010/0007175 | A1 | 1/2010 | Mayer et al. |
| 2010/0017574 | A1 | 1/2010 | Takahashi et al. |
| 2010/0025203 | A1 | 2/2010 | Ignasiak et al. |
| 2010/0032004 | A1 | 2/2010 | Baker et al. |
| 2010/0039646 | A1 | 2/2010 | Bourderionnet et al. |
| 2010/0051083 | A1 | 3/2010 | Boyk |
| 2010/0051086 | A1 | 3/2010 | Keshner et al. |
| 2010/0071683 | A1 | 3/2010 | Selig et al. |
| 2010/0089433 | A1 | 4/2010 | Conger |
| 2010/0101625 | A1 | 4/2010 | Kats et al. |
| 2010/0101630 | A1 | 4/2010 | Kats et al. |
| 2010/0101632 | A1 | 4/2010 | Kats et al. |
| 2010/0122722 | A1 | 5/2010 | Halpern |
| 2010/0147286 | A1 | 6/2010 | Xiang et al. |
| 2010/0218806 | A1 | 9/2010 | Arab et al. |
| 2010/0223865 | A1 | 9/2010 | Gonzalez Moreno |
| 2010/0229851 | A1 | 9/2010 | Reynolds |
| 2010/0236601 | A1 | 9/2010 | Okamoto |
| 2010/0258110 | A1 | 10/2010 | Krabbe et al. |
| 2011/0192394 | A1 | 8/2011 | Brothersen |

FOREIGN PATENT DOCUMENTS

| | | |
|---|---|---|
| AU | 2004221388 | 9/2004 |
| AU | 2005256882 | 1/2006 |
| AU | 2006341135 | 10/2007 |
| AU | 2007306303 | 4/2008 |
| AU | 2008231261 | 10/2008 |
| AU | 2008231262 | 10/2008 |
| AU | 2008231263 | 10/2008 |
| AU | 2008282802 | 2/2009 |
| AU | 2008303046 | 4/2009 |
| AU | 2009217752 | 9/2009 |
| AU | 2009237000 | 10/2009 |
| AU | 2009251510 | 12/2009 |
| AU | 2009251196 | 1/2010 |
| CA | 2 645 465 | 5/2009 |
| CN | 1589384 | 3/2005 |
| CN | 201028839 | 2/2008 |
| CN | 201045737 | 4/2008 |
| CN | 101192800 | 6/2008 |
| CN | 101263349 | 9/2008 |
| CN | 201134769 | 10/2008 |
| CN | 201170861 | 12/2008 |
| CN | 201170862 | 12/2008 |
| CN | 201234220 | 5/2009 |
| CN | 201234221 | 5/2009 |
| CN | 101512242 | 8/2009 |
| CN | 101582659 | 11/2009 |
| CN | 101800496 | 8/2010 |
| DE | 196-25-204 | 1/1998 |
| DE | 10-2008-050-250 | 4/2010 |
| EP | 0114240 A1 | 8/1984 |
| EP | 1169604 | 1/2002 |
| EP | 1602133 | 12/2005 |
| EP | 1604407 | 12/2005 |
| EP | 1791184 A1 | 5/2007 |
| EP | 1870645 | 12/2007 |
| EP | 2034251 | 3/2009 |
| EP | 2051306 | 4/2009 |
| EP | 2108900 | 10/2009 |
| ES | 1065128 | 6/2007 |
| ES | 1066823 | 3/2008 |
| ES | 2294903 | 4/2008 |
| ES | 1068609 | 11/2008 |
| ES | 2327988 | 11/2009 |
| ES | 2336751 | 4/2010 |
| FR | 2 814 225 | 3/2002 |
| FR | 2 855 595 | 12/2004 |
| IN | 647/DELNP/2004 A | 3/2004 |
| IN | 1056/CHENP/2004 A | 2/2006 |
| IN | 292/MUM/2004 | 8/2006 |
| IN | 1391/DEL/2004 | 8/2006 |
| IN | 12/MUMNP/2006 | 9/2006 |
| IN | 107/MUM/2005 | 9/2006 |
| IN | 1199/MUM/2001 | 10/2006 |
| IN | 1251/DEL/2002 A | 12/2007 |
| IN | 1298/KOLNP/2008 A | 1/2009 |
| IN | 1981/DEL/2007 A | 2/2009 |
| IN | 2010/DEL/2007 A | 4/2009 |
| IN | 2022/DEL/2007 A | 4/2009 |
| IN | 869/DEL/2008 A | 10/2009 |
| IN | 6542/CHENP/2009 A | 3/2010 |
| IN | 2149/MUM/2008 A | 4/2010 |
| IN | 534/KOLNP/2010 A | 5/2010 |
| IN | 1273/CHE/2010 A | 6/2010 |
| IN | 1829/DEL/2009 A | 6/2010 |
| IN | 1837/DELNP/2010 A | 8/2010 |
| IN | 1922/DEL/2010 A | 10/2010 |
| JP | 11-340491 | 12/1999 |
| JP | 2008-218582 | 9/2008 |
| KR | 20100124386 A | 11/2010 |
| WO | WO/96/29745 | 9/1996 |

(56) References Cited

FOREIGN PATENT DOCUMENTS

| | | |
|---|---|---|
| WO | WO/2007/011442 | 1/2007 |
| WO | WO/2007/038760 | 4/2007 |
| WO | WO/2008/058411 | 5/2008 |
| WO | WO/2008/084102 | 7/2008 |
| WO | WO/2009/067614 | 5/2009 |
| WO | WO/2009/096754 | 8/2009 |
| WO | WO/2009/103829 | 8/2009 |
| WO | WO/2009/121174 | 10/2009 |
| WO | WO/2009/140564 | 11/2009 |
| WO | WO/2009/147454 | 12/2009 |
| WO | WO/2009/149891 | 12/2009 |
| WO | WO/2009/152343 | 12/2009 |
| WO | WO/2009/155530 | 12/2009 |
| WO | WO/2010/002177 | 1/2010 |
| WO | WO/2010/006460 | 1/2010 |
| WO | WO/2010/018265 | 2/2010 |
| WO | WO/2010/033952 | 3/2010 |
| WO | WO/2010/034038 | 3/2010 |
| WO | WO/2010/059218 | 5/2010 |
| WO | WO/2010/060256 | 6/2010 |
| WO | WO/2010/065941 | 6/2010 |
| WO | WO/2010/072871 | 7/2010 |
| WO | WO/2010/085592 | 7/2010 |
| WO | WO/2010/093099 | 7/2010 |
| WO | WO/2010/086309 | 8/2010 |
| WO | WO/2010/098973 | 9/2010 |
| WO | WO/2010/103378 | 9/2010 |
| WO | WO/2010/105111 | 9/2010 |
| WO | WO/2010/116007 | 10/2010 |
| WO | WO/2010/119469 | 10/2010 |
| WO | WO/2010/120123 | 10/2010 |
| WO | WO-2010/141740 A2 | 12/2010 |

* cited by examiner

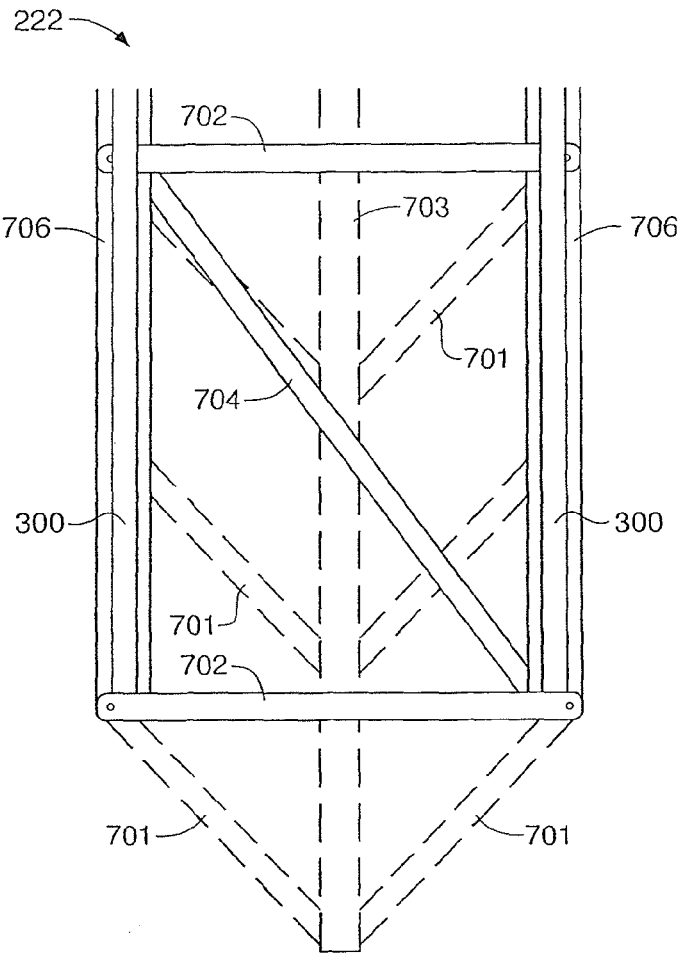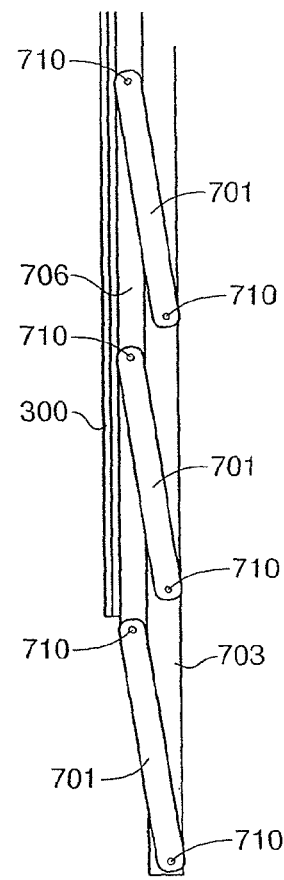
FIG. 7G  FIG. 7H
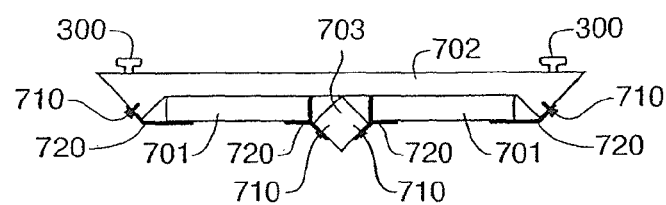
FIG. 7I

US 9,413,287 B2

PHOTOVOLTAIC MODULE SUPPORT SYSTEM

CROSS-REFERENCE TO RELATED APPLICATION

This application is a divisional of U.S. patent application Ser. No. 14/470,151, filed Aug. 27, 2014, which is a divisional of U.S. patent application Ser. No. 13/784,374, filed Mar. 4, 2013, now U.S. Pat. No. 8,844,214, issued Sep. 30, 2014, which is a divisional of U.S. patent application Ser. No. 13/011,185, filed Jan. 21, 2011, now U.S. Pat. No. 8,407,950, issued Apr. 2, 2013, the entirety of which are incorporated herein by reference.

FIELD OF THE INVENTION

The invention relates generally to photovoltaic systems, and more specifically to a photovoltaic module support system.

BACKGROUND OF THE INVENTION

Solar energy produced by the sun can be captured by photovoltaic (PV) modules. Mounting systems for PV modules can be fixed or can track the sun's diurnal motion. Typical single axis tracking systems include a torque tube (roughly five feet above grade) capable of rotating a group of PV modules, which is installed on support posts (driven piles, drilled concrete piles or ballasted foundation). The torque tube supports one or more PV module support structures and PV modules on the support structure (or framed PV modules affixed directly to the torque tube). PV module power plants typically have hundreds or even thousands of rows of PV modules that are fixed in place and must be rotated to track the sun's diurnal motion.

FIGS. 1a-1c illustrate one example of a typical single axis tracking system for PV modules. Multiple PV modules 100 are arranged in parallel rows 400, 500, and 600. The rows 400, 500, 600 generally run in the north-south direction, so that PV modules 100 in the rows can be tilted east and west to track the sun's rotation. The PV modules 100 are mounted onto a torque tube 115 elevated above the ground by support posts 104 that may be driven into the ground 110.

At gaps 150 between PV modules 100 in a row 400, 500, 600, a gearbox 101 or other rotation point is affixed to the torque tube 115 on either side of a PV module 100. The gearbox 101 may be driven by independent motors at each support post 104, or more commonly may be connected by an cantilevered lever arm 102 to a linkage 105 that connects all of the assemblies in a column of the PV array, as illustrated in FIGS. 1a-1c.

FIGS. 1b and 1c illustrate the rotation of PV modules 100 when the linkage 105 is driven in a horizontal direction (for example, by a motorized screw mounted to a concrete base at one end of a column), the movement of the linkage 105 and the cantilevered lever arms 102 connected to gearboxes 101 causes the PV modules 100 to tilt to track the path of the sun. The PV modules may be tilted east or west in accordance with the movement of the sun. Typically, the rotation point, for example at gearbox 101, is roughly five feet above the ground, and the linkage 105, when employed, is 2-3 feet above the ground.

There are numerous problems with existing mounting systems such as the one illustrated in FIGS. 1a-1c. First, these mounting systems have a high center of gravity, due to the rotation point being at the very top of the mounting system. This can be a problem, as solar tracker systems must withstand high wind conditions. Second, using independent motors at each foundation is costly and inefficient. If the rotation points are instead connected by the linkage 105 illustrated in FIGS. 1a and 1b, the linkage 105 impedes on construction, commissioning, and maintenance traffic flow through the PV array rows. Third, the gearbox 101 used to rotate the PV modules 101 and the support posts 104 both require space between the PV modules 100, as illustrated in FIG. 1a, preventing the PV modules 100 from being placed directly adjacent one another. This reduces the effective surface area of the array and is an inefficient use of real estate. Accordingly, there is a need in the art for a tracker system support structure that mitigates these and other problems.

BRIEF DESCRIPTION OF THE DRAWINGS

FIGS. 7a-7k illustrate top down, side, front, and detail views of a folding truss in accordance with an embodiment described herein.

DETAILED DESCRIPTION OF THE INVENTION

In the following detailed description, reference is made to the accompanying drawings which form a part hereof, and which illustrate specific embodiments of the invention. These embodiments are described in sufficient detail to enable those of ordinary skill in the art to make and use them. It is also understood that structural, logical, or procedural changes may be made to the specific embodiments discussed herein, without departing from the spirit or scope of the invention.

Described herein is support system for photovoltaic (PV) modules in a solar panel array. The support system utilizing a truss and cradle assembly described herein has beneficial structural properties that enable an increase in the distance between support posts and allows PV modules to be placed directly adjacent one another in a row, resulting in more efficient usage of real estate. The system also enables unobstructed passage between array rows during construction, commissioning, and maintenance. Embodiments of the system described herein enable rotation of multiple rows of PV modules in unison with a low center of gravity rotation point.

Figure 2A:
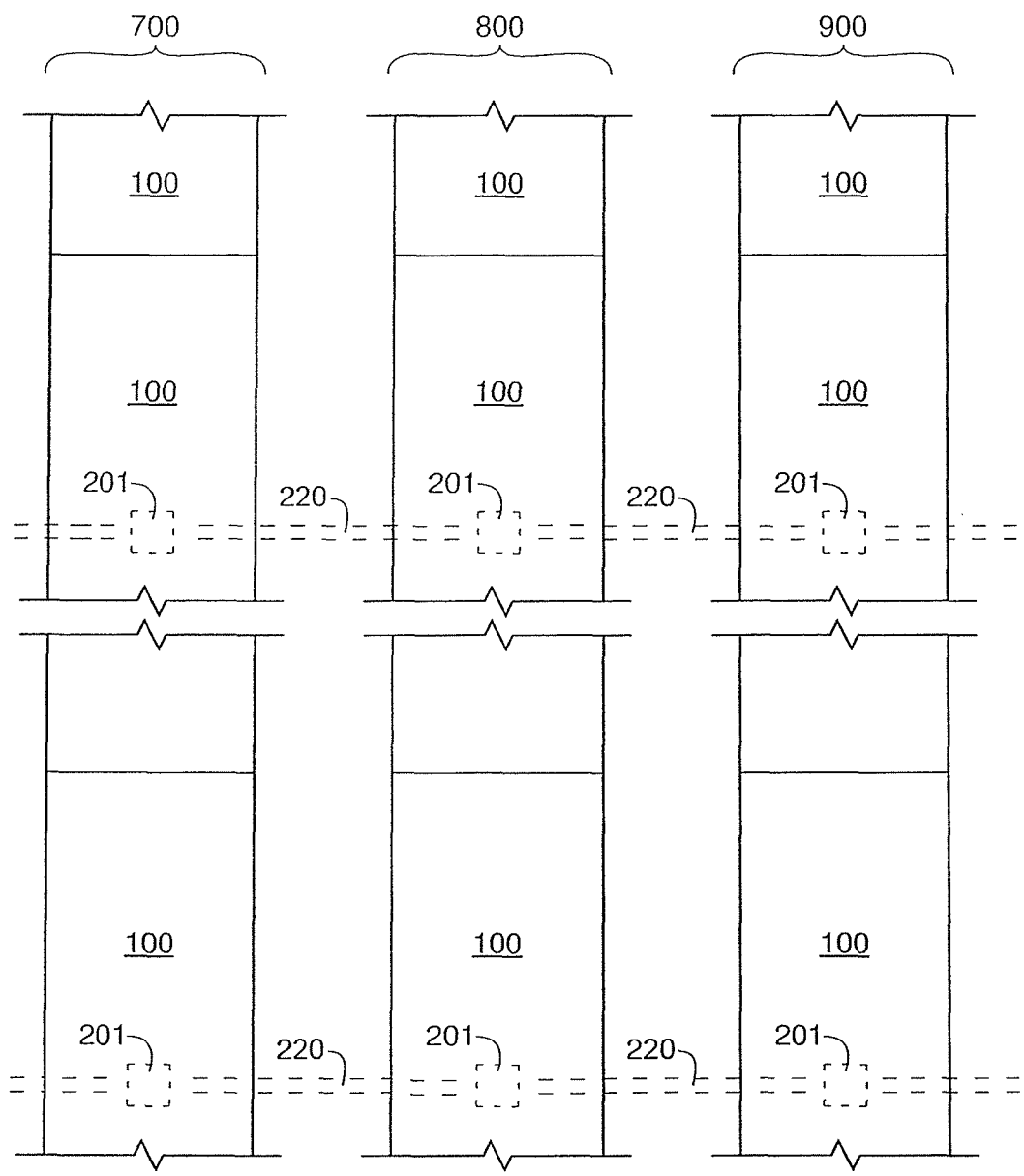
FIGS. 2a-2c illustrate top down and side views of a support system for a single axis solar tracker array using a truss and cradle assembly in accordance with an embodiment described herein.
Figure 2B:
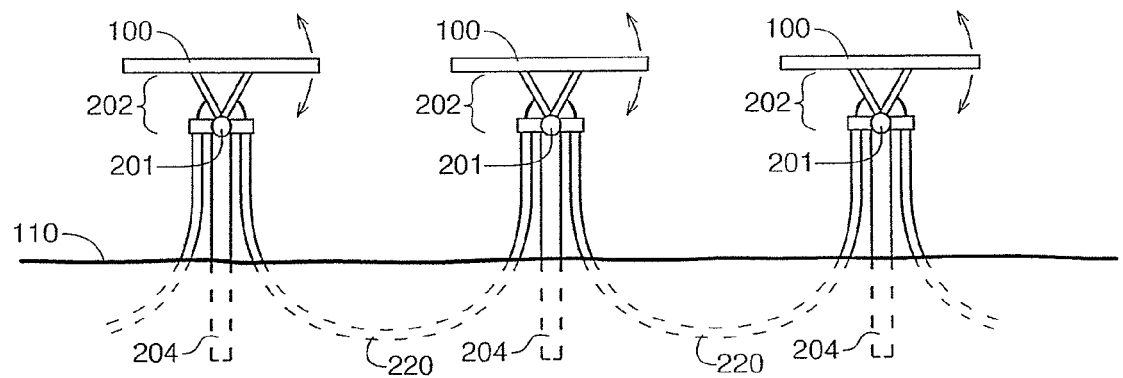
Figure 2C:
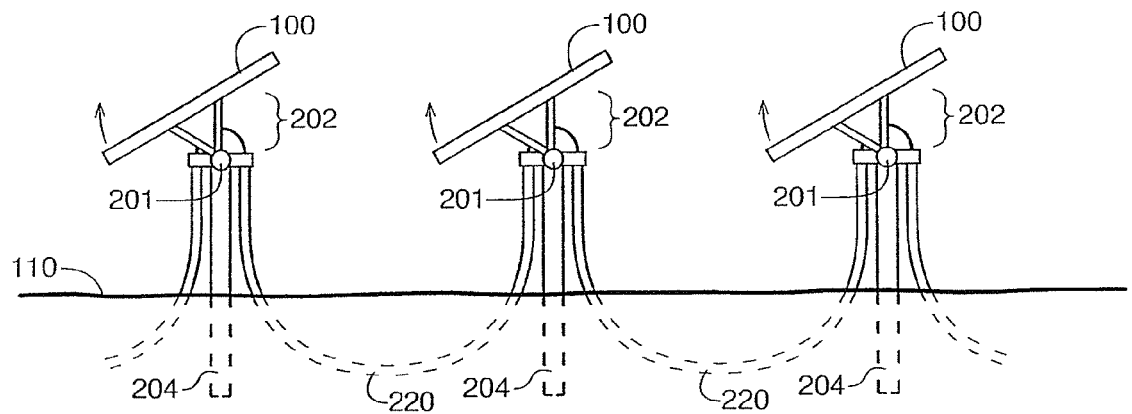

FIGS. 2a-2c illustrate an embodiment of a PV module support system utilizing a truss and cradle assembly. Photovoltaic (PV) modules 100 are arranged in parallel rows 700, 800, 900 in a photovoltaic array. Photovoltaic modules 100 in a row 700, 800, 900 are affixed to and supported by a truss and cradle assembly 202. The truss and cradle assembly 202 supports a manually installed frame and PV module system, or an automated install (cartridge) module support system such as described in U.S. patent application Ser. No. 12/846,621 entitled "A Mounting System Supporting Slidable Installation of a Plurality of Solar Panels as a Unit" (filed Jul. 29, 2010), U.S. patent application Ser. No. 12/846,365 entitled "Slider Clip and Photovoltaic Structure Mounting System" (filed Jul. 29, 2010), U.S. patent application Ser. No. 12/846,686 entitled "Apparatus Facilitating Mounting of Solar Panels to a Rail Assembly" (filed Jul. 29, 2010), and U.S. patent application Ser. No. 12/957,808 entitled "Method and Apparatus Providing Simplified Installation of a Plurality of Solar Panels" (filed Dec. 1, 2010), which are each incorporated by reference herein in their entirety. The truss and cradle assembly 202 is rotatably fixed by a rotary axis 201 to a foundation support 204, which may be driven piles, drilled concrete piles, ballasted foundation, or other suitable support structure.

The truss and cradle assembly 202 at each row 700, 800, 900 of the array is driven by an electric motor and gearbox or a hydraulic system that is installed on opposite ends of a group of array columns, generally the east and west ends, as described in more detail below. An underground linkage 220 connected to the drive motors facilitates rotating PV modules 100 in multiple rows 700, 800, and 900 in unison to track the sun's diurnal motion. Rotation of the truss and cradle assembly 202 at axis 201 is illustrated in FIGS. 2b-2c and is discussed in more detail below.

Figure 1A:
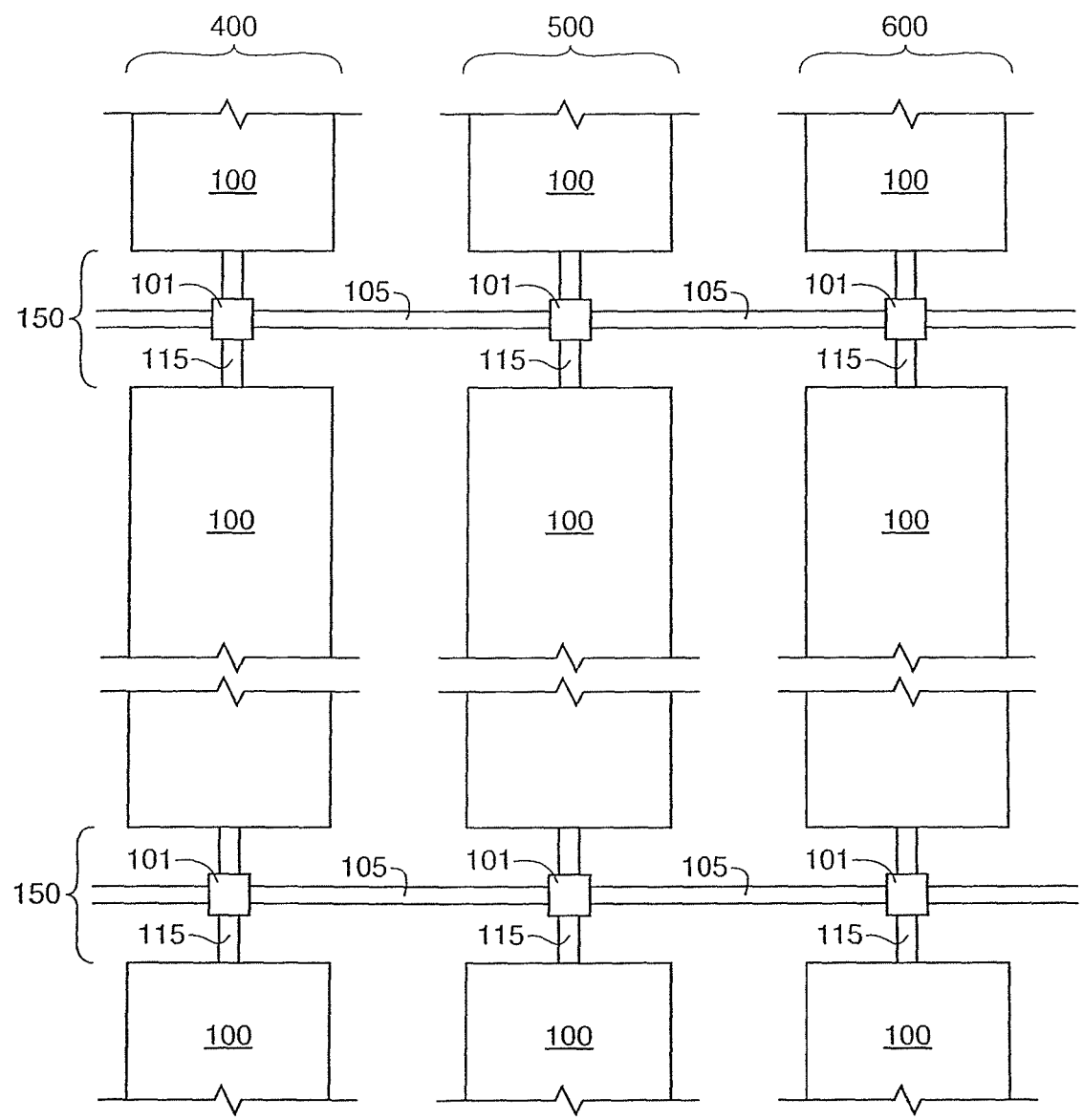
FIGS. 1a-1c illustrate an example support system for a conventional single axis solar tracker array.
Figure 1B:
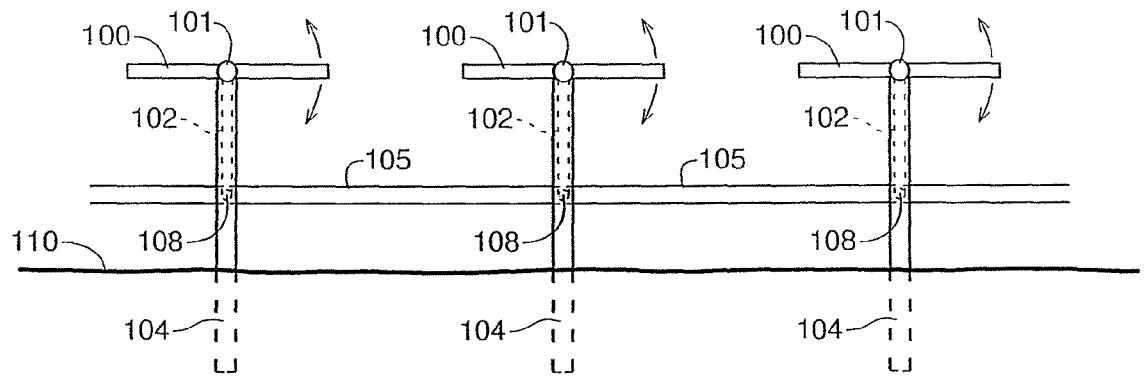
Figure 1C:
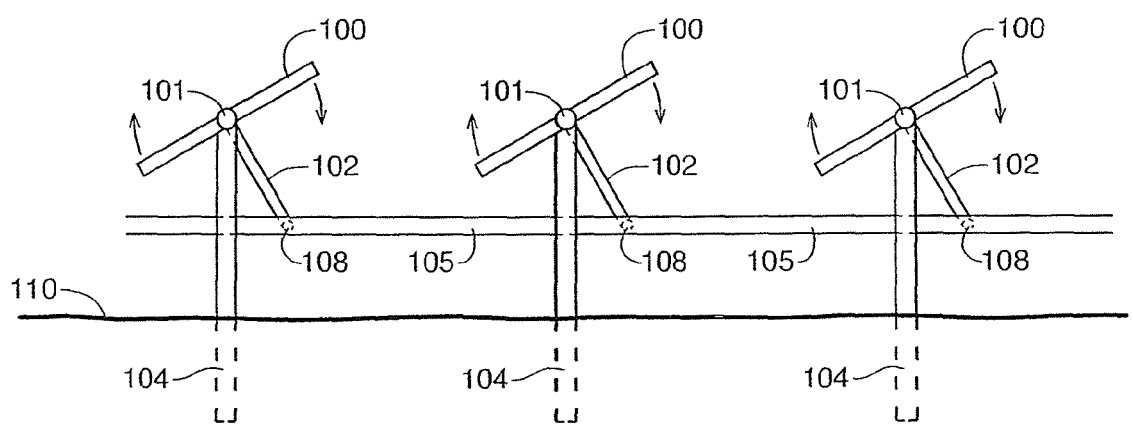

Comparing the system in FIGS. 2a-2c to the one in FIGS. 1a-1c, it is apparent that the truss and cradle assembly 202 facilitates the formation of rows of PV modules 100 that do not have gaps 150 between PV modules 100 needed in the FIGS. 1a-1c embodiment to provide space for the gearbox 101. Since the FIGS. 2a-2c embodiment does not require this gap, longer spans of directly adjacent PV modules, or PV modules of a longer length than in other systems, can be used, resulting in a more efficient PV system. Also, the underground linkage 220 enables unobstructed passage between array rows 700, 800, 900 during construction, commissioning, and maintenance. Further, the system in FIGS. 2a-2c has a rotation point that is lower to the ground than the system in FIGS. 1a-1c. The FIGS. 1a-1c system requires a rotation point at the very top of the foundation support (about 5 feet above the ground), and, when the rows are connected to one another by linkages 105, the cantilevered lever arm 102 and linkage 105 hang below this rotation point. In the FIGS. 2a-2c embodiment, however, the same rotation is achieved with a rotation point well below the top of the foundation structure (the rotation point can be about half as high as that in the FIGS. 1a-1c embodiment, or about 2-3 feet above the ground), and with a less obstructive linkage 220. This improves stability and allows the spacing between foundation supports 204 to be increased.

Figure 3A:
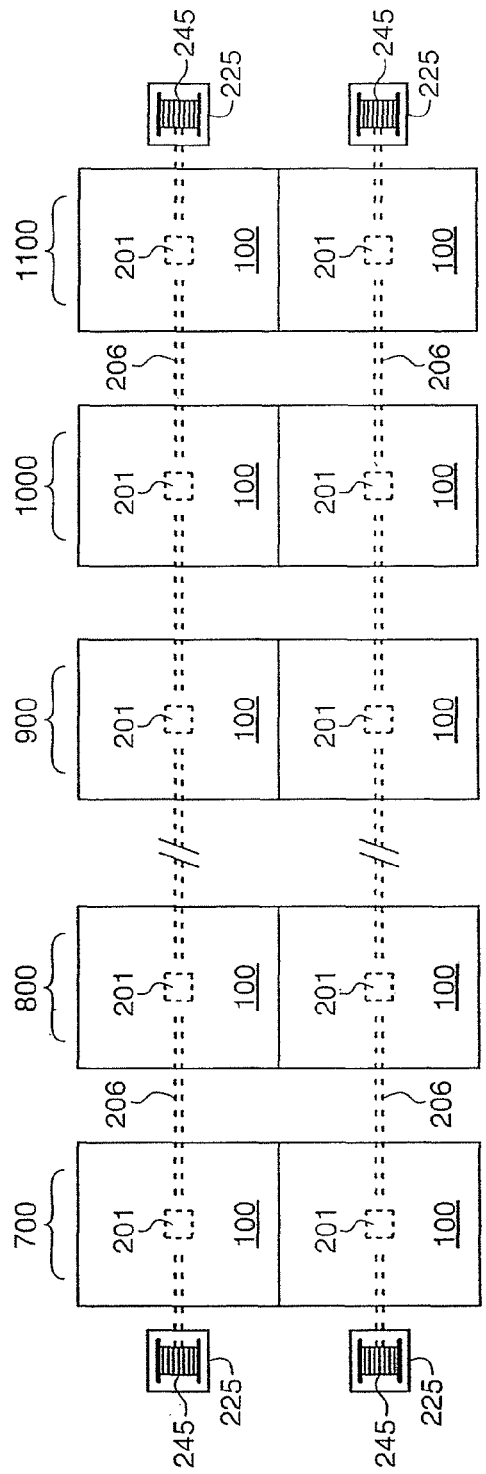
FIGS. 3a-3f illustrate top down, side, and perspective views of a support system for a single axis solar tracker array using a truss and butterfly cradle assembly in accordance with another embodiment described herein.

FIGS. 3a-3f further illustrate aspects of the embodiment of FIGS. 2a-2c. As illustrated in FIG. 3a, there are multiple PV modules 100 in each row 700, 800, 900, 1000, 1100. While one PV module is shown above each foundation support 204 in FIGS. 3a-3c, the system can include many PV modules 100 on the truss 202 between each foundation support, or one PV module 100 may span multiple foundation supports 204. All of the rows 700, 800, 900, 1000, 1100 of PV modules 100 are driven by two electric motor and gearbox structures 225 installed at each end of the column. Alternatively, a hydraulic system or other motive system can also be used, as described below.

Figure 3B:
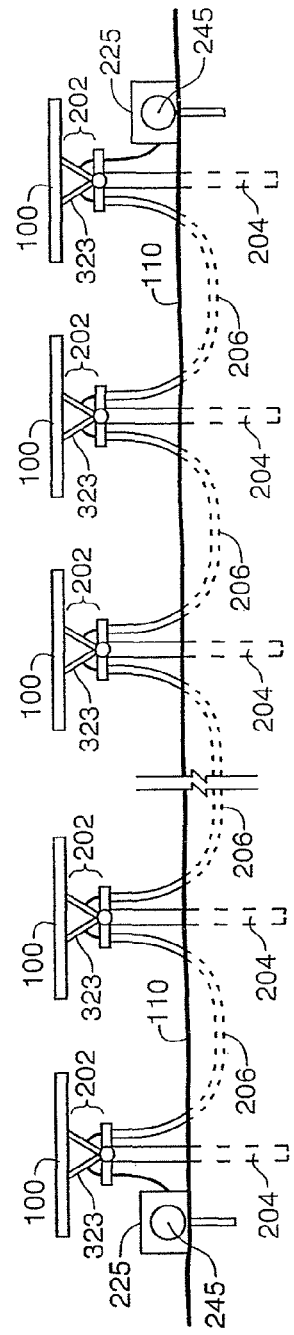
Figure 3C:
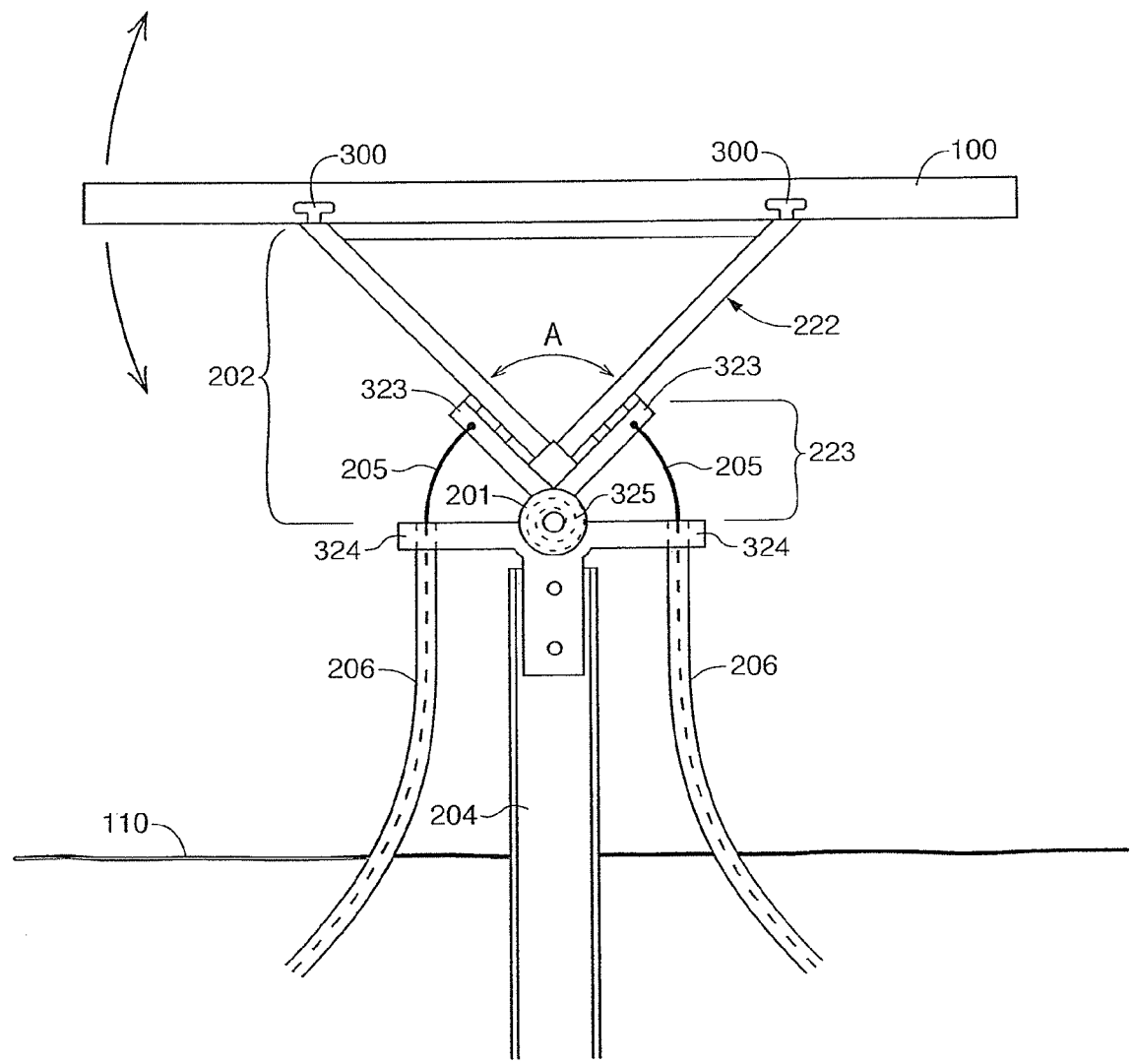

FIG. 3c provides a more detailed view of the truss and cradle assembly 202. The PV module 100 is attached to a triangular truss 222 by installation rails 300 which enable a sliding connection with a recess in the PV modules 100 or a carrier for a plurality of modules in the manner illustrated in U.S. patent application Ser. No. 12/846,621. The PV modules 100 of this or any other embodiment described herein can also be attached to the triangular truss 222 using conventional clips, fasteners, screws, glue or any other suitable mechanism for attaching PV modules 100 to the triangular truss 222.

The truss 222 is affixed to a cradle 223, which in this embodiment is a butterfly cradle 222 having movable butterfly drive wings 323 and non-moving (fixed) butterfly drive arms 324. The butterfly drive wings 323 are affixed to and support the truss 222, and can be rotated about the axis 201 in either direction. The axis 201 may be a rotation bearing assembly, a gear drive, or any other suitable rotating connection. The axis 201 may be biased, for example, by a spring 325 inside a rotation bearing of the axis 201, so that, when not acted upon by another force, the axis will return to a position holding the PV module 100 parallel to the ground 110 (the orientation illustrated in FIG. 3c). Other forces may be used to bias the axis 201, such as external springs connected between butterfly drive wings 323 and the non-moving butterfly drive aims 324, a programmable microprocessor that returns a gear drive axis to an upright position, or any other mechanism suitable for returning the PV module 100 to a parallel position when in not being acted upon by another force. The cradle structure 223 is attached to the foundation 204.

Linkages 205 pass through holes in the non-moving (fixed) butterfly drive arms 324, and are connected to the movable butterfly drive wings 323. Thus, when a linkage 205 is pulled in a downward direction, it will pull down the respective connected movable butterfly drive wing 323 of the cradle 223, which causes the movable butterfly drive wing 323 to rotate about axis 201, thus tilting the PV module 100. Linkages 205 may be a braided metal wire or other moveable connection. A sheath 206 around the linkages 205 allows free movement under ground 110, and can be used to protect the linkages (and as a safety measure) above ground.

In FIG. 3c, the example support system facilitates rotation of the PV module 100 to an orientation of about 45 degrees to either side. The rotation would generally be in the East-West direction, following the orientation of the sun. Greater rotation angles can be achieved by using a triangle truss 222 and cradle 223 with an acute angle A, providing greater rotation before reaching the butterfly drive arm 324 of the cradle 223. Similarly, a more restricted rotation can be obtained by using a triangle truss 222 and cradle 223 with an obtuse angle A.

Figure 3D:
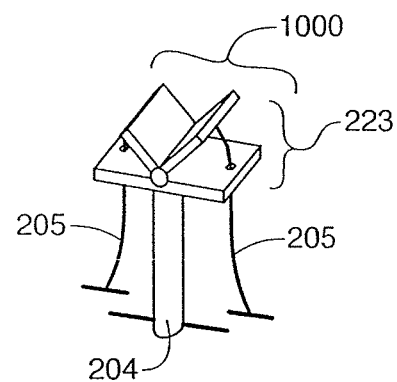
Figure 3D:
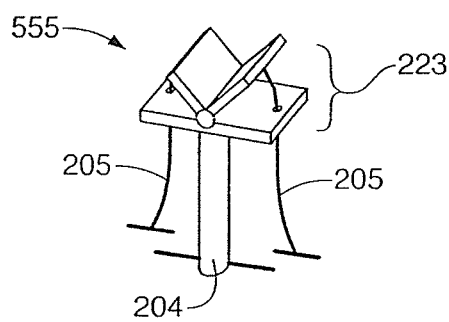
Figure 3E:
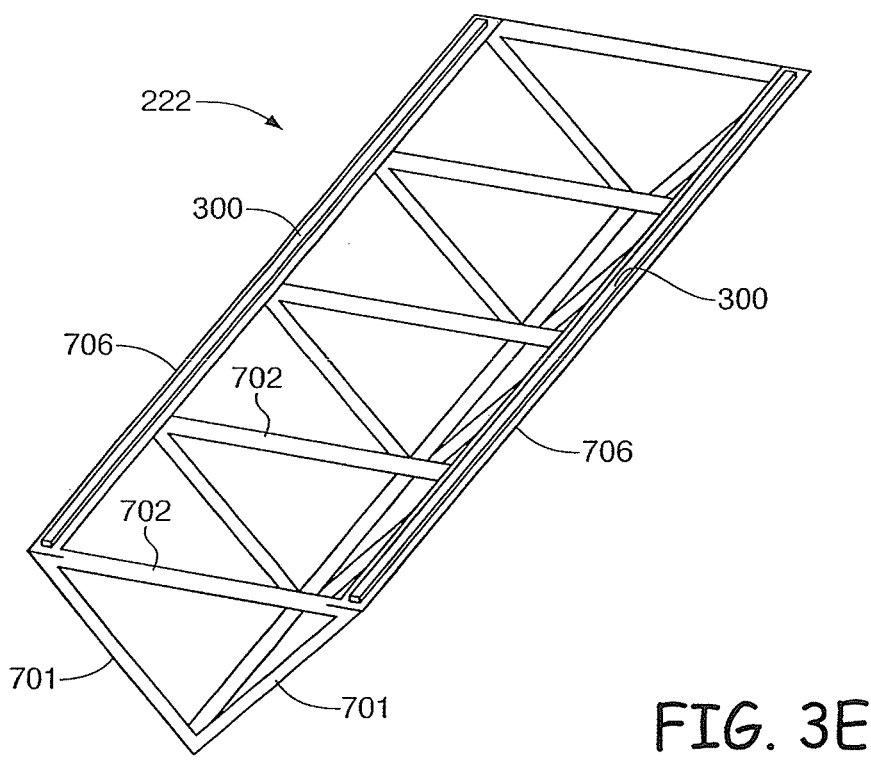
Figure 3F:
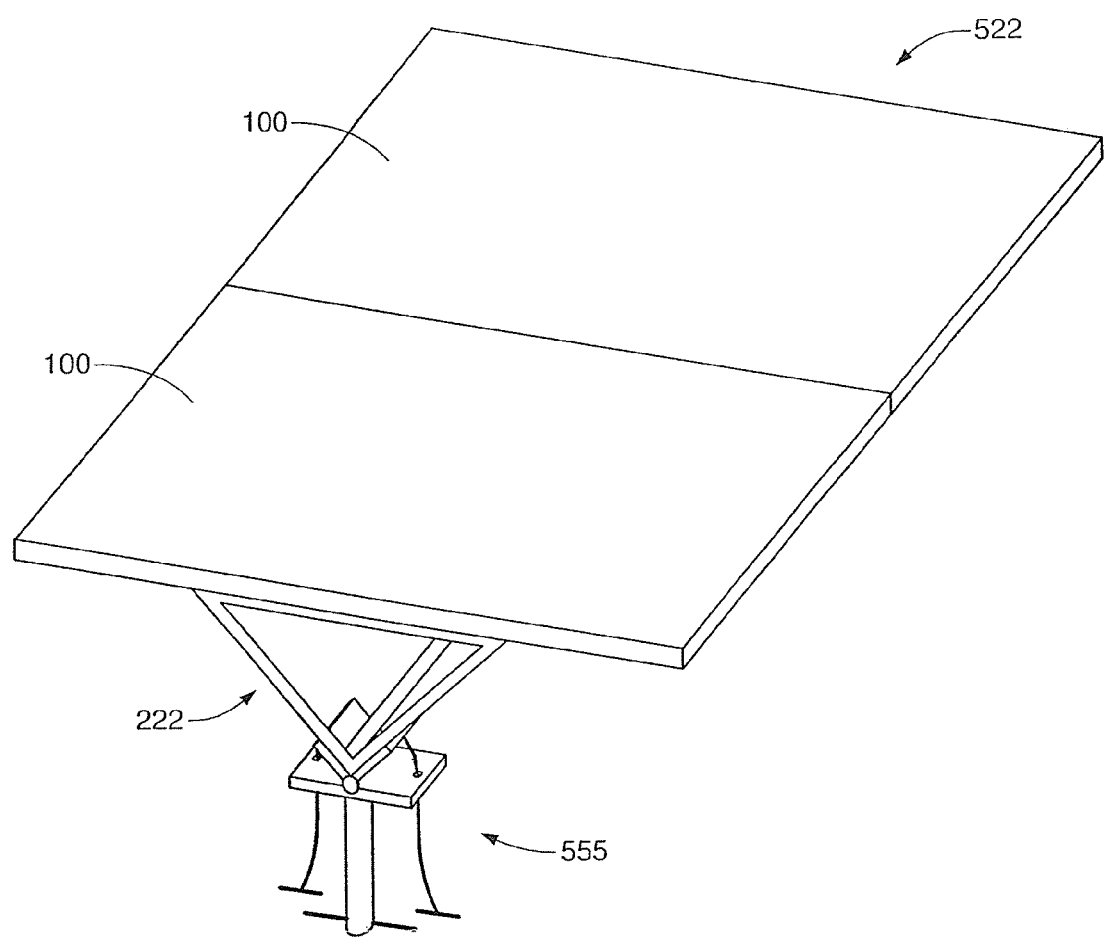

FIGS. 3d-3f provide perspective views of components in the FIGS. 3a-3c embodiment. FIG. 3d illustrates two support structures 555 that include foundations 204 and cradle structures 223. The support structures 555 have been installed in a row 1000. These support structures 555 can support a truss 222, such as the truss illustrated in FIG. 3e. Multiple support structures 555 in a row may support a single truss 222.

FIG. 3e illustrates a perspective view of the truss 222. The truss 222 includes top rails 706 connected to side supports 701 and top supports 702. Though shown here as a triangular support structure with rail side supports 701 and open sides, the truss 222 could also have planar side supports 701 that create a continuous side wall on the sides of the truss 222. The truss 222 may be any length suitable for transport and on-site installation. The truss 222 may be a fixed structure or may be a folding truss (described in more detail below). The top rails 706 may be configured with parallel installation rails 300 that enable PV modules 100 to be mounted by sliding multiple PV modules 100 onto the installation rails 300. Alternatively, a cartridge that holds a plurality of PV modules 100 may be slidably mounted onto the installation rails 300 of top rails 706. Though shown here configured with installation rails 300 for mounting PV modules 100, any suitable mounting method may be used to affix PV modules 100 to the top rails 706, as discussed above. FIG. 3*f* illustrates the support structure 555 with the truss 222 and PV modules 100 installed.

The tilting of multiple rows of PV modules 100 in unison is now described with reference to FIGS. 3*a*-3*b*. In FIGS. 3*a*-3*b*, the connection of each row 700, 800, 900, 1000, 1100 by linkages 205 enables rotation of several rows in unison. In this embodiment, electric motors and gearboxes 225 at each end of the column provide the necessary force to move the linkages 205. Multiple electric motors and gearboxes 225 at each end of the column may be used for long-spanning rows, to provide sufficient power to tilt the entire row.

To tilt the PV modules 100, the motor and gearbox 225 at one end of the column retracts the linkage 205, for example by winding the connected linkage 205 around a spool 245. When the linkage 205 is retracted, it pulls downward on the movable butterfly drive wing 323 of the connected cradle 202, and this causes the butterfly drive wing 323 to rotate about its axis, tilting the PV modules 100 in one direction. Since all of the cradles 202 in the rows 700, 800, 900, 1000, 1100 are connected by linkages 205, all of the PV modules 100 in the column are tilted in the respective direction by the tension of the linkages 205 between the cradles 222. To tilt the assemblies 202 back in the opposite direction, the motor and gearbox 225 at the other end of the column retracts the connected linkage 205, and the PV modules 100 are tilted back in the opposite direction.

The truss and cradle assemblies 202 may be biased into a neutral position (orienting PV modules parallel to the ground 110) by a spring 325 in a rotation bearing of axis 201, or any other suitable biasing structure. This way, if the electric motors and gearbox 225 fails (due to power outage or other reasons), the system will maintain this neutral position. This avoids damage by winds, and inefficiencies that can be caused by a static tilted position.

Retracting linkages 205 using an electric motor and gearbox 225 is one way to move the rows in unison, but those of skill in the art will recognize that there are other acceptable ways to tilt these assemblies in unison. For example, if the linkage 220 is sufficiently rigid, motors and gearboxes 225 are only necessary on one end of the column, as they could both push and pull the linkages 220 (as opposed to only pulling, as described above). A hydraulic system could also be used at one end of the column to both push and pull the linkages 220 to tilt the PV modules 100.

Figure 4A:
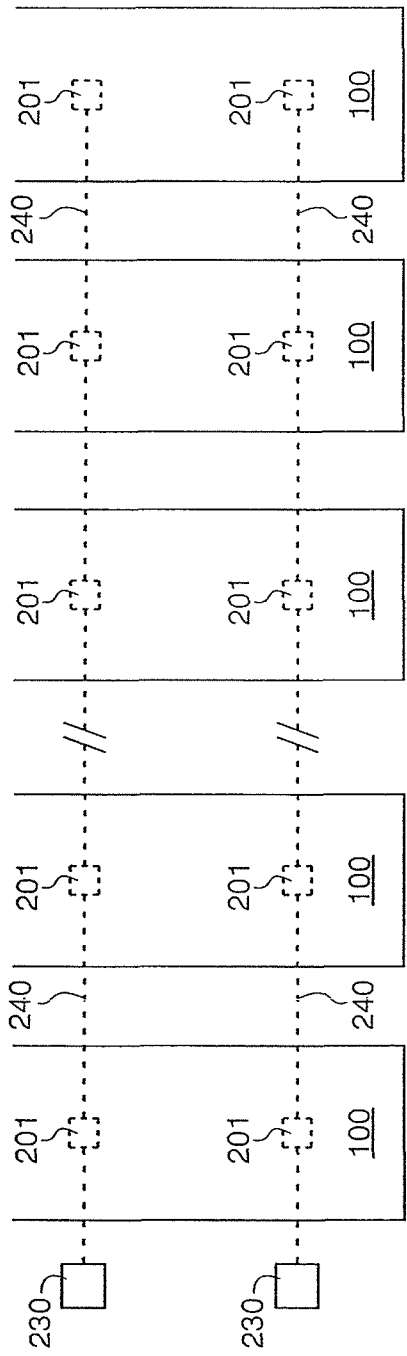
FIGS. 4a-4c illustrate top down and side views of a support system for a single axis solar tracker array using a truss and cradle assembly in accordance with another embodiment described herein.
Figure 4B:
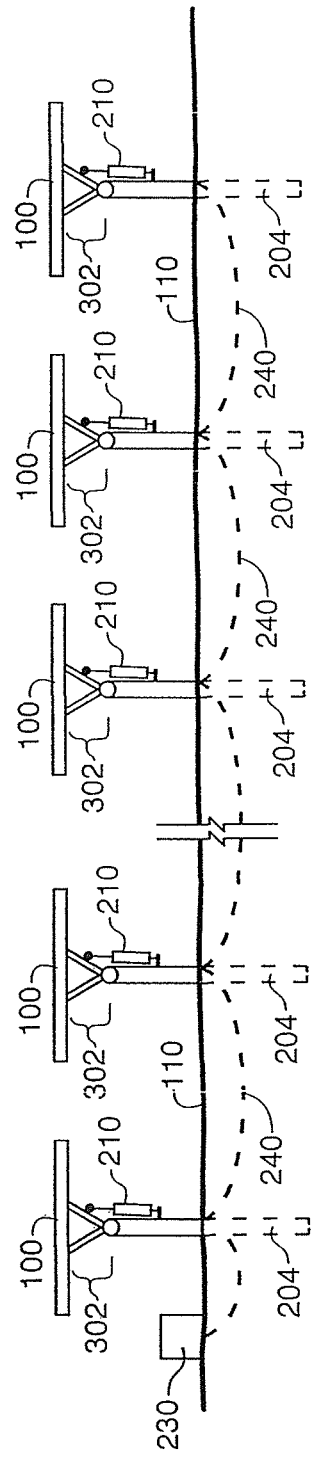
Figure 4C:
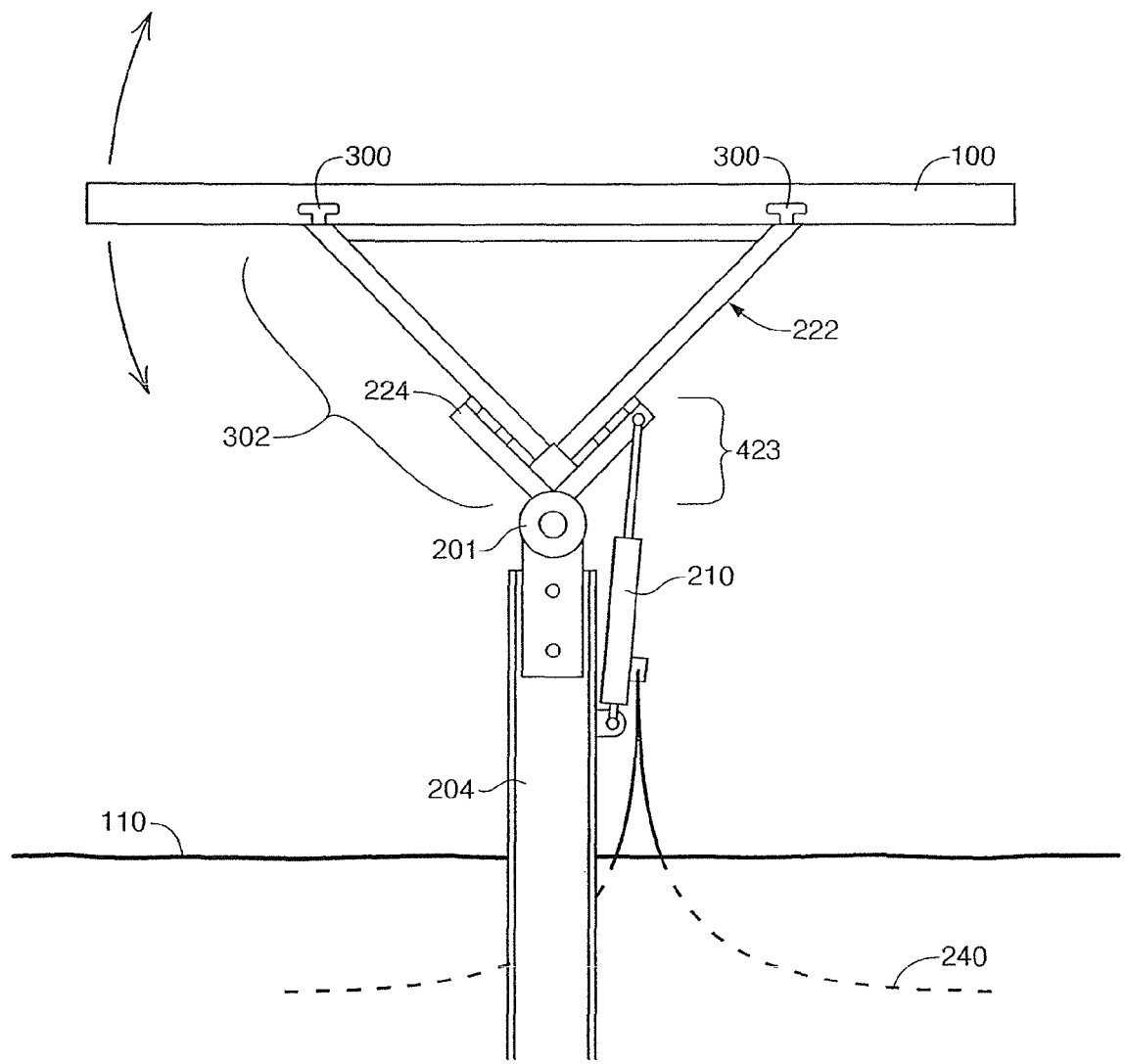

FIGS. 4*a*-4*c* illustrate another embodiment of a PV module support system utilizing a truss and cradle assembly. This embodiment uses a similar truss and cradle assembly 302, but the cradle is configured with only one set of drive arms, and instead of being driven by linkages 205 connected to an electric motor and gearbox 225 or hydraulics, it is driven by individual electric actuators 210 located at each foundation support. The electric actuators 210 push or pull one side of the truss and cradle assembly 302 to tilt the PV modules 100 in one direction or another. The electric actuators 210 are connected by an electrical connection 240 such as a shielded electrically conductive wire. The electrical connection 240 is connected, at one end of the PV array, to a power supply 230. As in the other embodiments, the truss and cradle assembly 302 may be biased in a neutral position, so that if there is a failure of the electric actuators 210 or the electrical connection 240, the truss and cradle assembly 202 will return to a neutral position.

FIG. 4*c* illustrates a detail view of one of the support structures in the FIGS. 4*a*-4*b* embodiment. As illustrated in FIG. 4*c*, the PV module 100 is connected to the truss and cradle assembly 302 by installation rails 300, but could also be connected using conventional clips, fasteners, screws, glue or any other suitable mechanism for attaching PV modules 100 to the triangular truss 222. The cradle 423 in this embodiment has a single set of drive arms 224, unlike the butterfly-style cradle in FIG. 3*c* (which has two sets of arms 323, 324). The cradle 423 is rotatably connected to an electric actuator 210 which can be a motor-driven or hydraulic actuator. The other end of the actuator 210 is rotatably connected to the foundation 204. When the actuator 210 pushes or pulls on the drive arm 224 of the cradle 423, the PV module 100 is rotated one direction or another. The axis 201 may allow any desired range of motion, including motion past 45 degrees in either direction. The actuator 210 can be electrically connected to actuators 210 of other support structures by an electrical connection 240, which may be under ground (as illustrated in FIG. 4*c*). The electrical connections 240 may also be run through the foundation 204 so that the wires are entirely protected from outside elements.

As with the FIG. 3*a*-3*f* embodiment, the truss and cradle assembly 302 of this embodiment facilitates the use of PV modules 100 which are mounted adjacent one another and without the presence of the PV module gaps 150 required due to the presence of the gearbox 101 in FIG. 1*a*. For this reason, longer PV modules can be used, resulting in a more efficient array and tracker system. Also, the underground electrical connection 240 enables unobstructed passage between array rows during construction, commissioning, and maintenance. Further, the system in FIGS. 4*a*-4*c* has the rotation point that is lower to the ground than the system in FIGS. 1*a*-1*c*, which improves stability and allows the spacing between foundation supports to be increased.

Figure 5A:
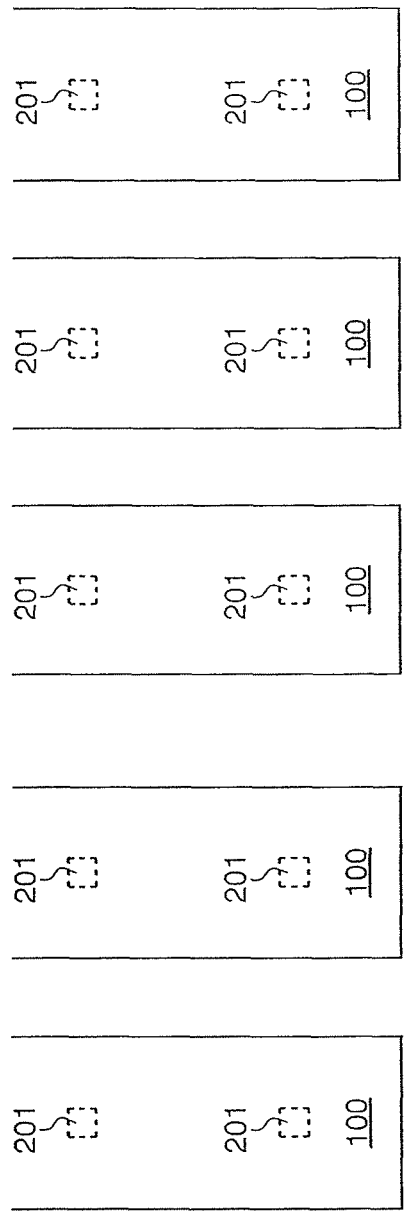
FIGS. 5a-5c illustrate top down and side views of a support system for a solar panel array using a truss and cradle assembly in accordance with another embodiment described herein.
Figure 5B:
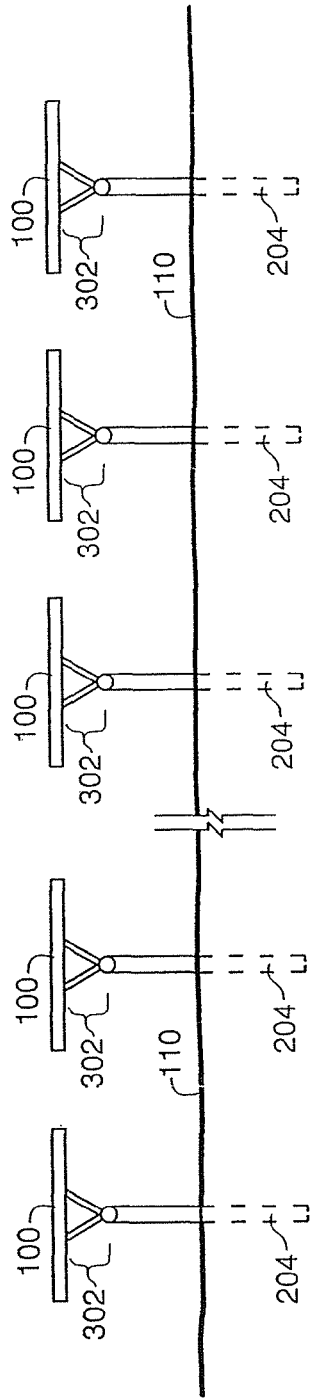
Figure 5C:
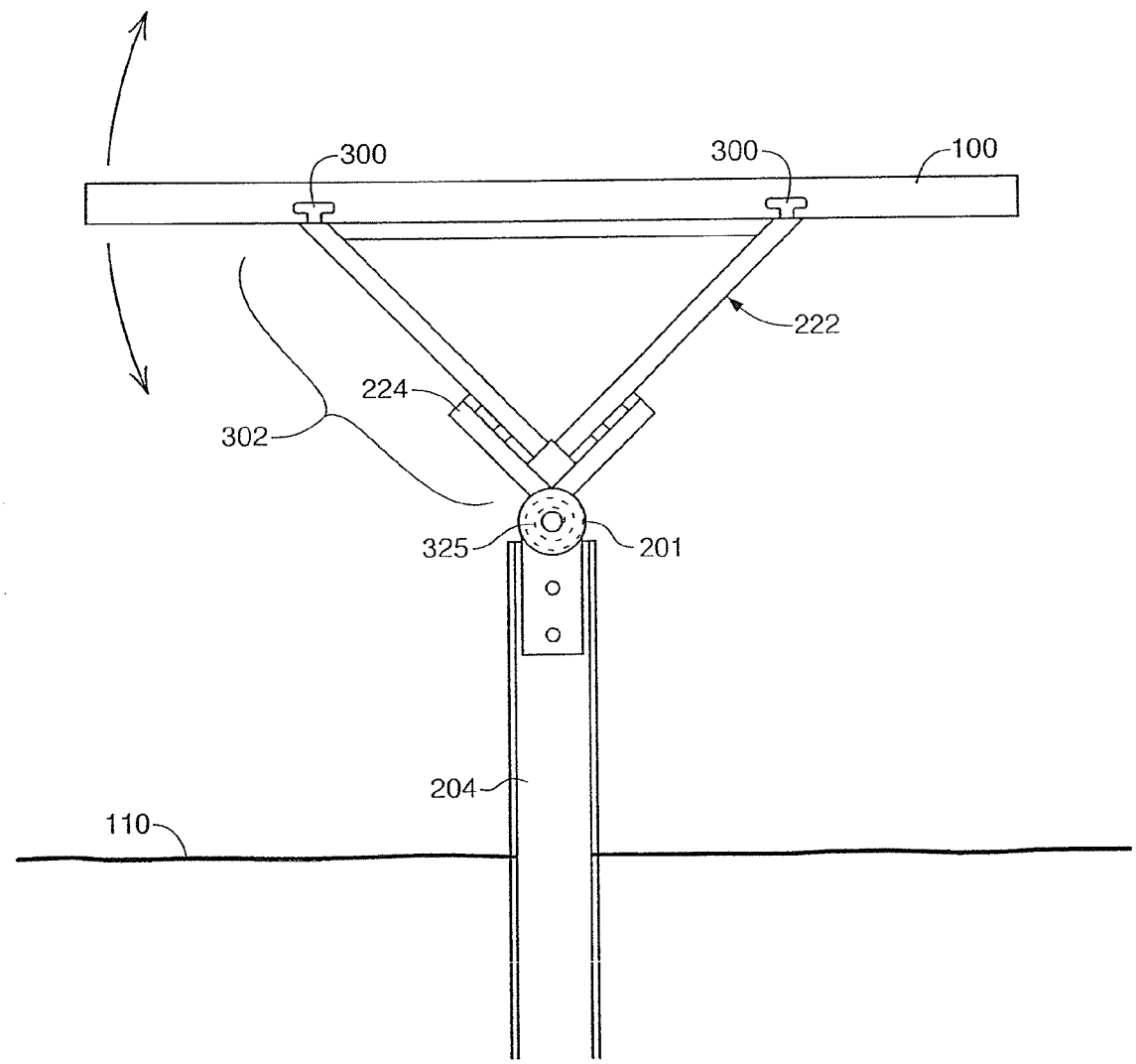

FIGS. 5*a*-5*c* illustrate yet another embodiment of a PV module support system utilizing a truss and cradle assembly. The FIGS. 5*a*-5*c* embodiment is essentially the same as the FIGS. 4*a*-4*c* embodiment (with like parts identified using like reference numbers), except this embodiment does not include the attached actuators 210. In this embodiment, the truss and cradle assembly 302 is not configured with any structure that would rotate the assembly 302 around the axis 201. The axis 201 can be biased using a spring 325 in the axis 201 assembly to maintain the PV module in the neutral position shown in FIGS. 5*b* and 5*c*.

The FIGS. 5*a*-5*c* embodiment provides several advantageous features of the other embodiments, including a low center of gravity, improved structural support, and the ability to use long-spanning PV modules. Additionally, the FIGS. 5*a*-5*c* embodiment can be upgraded in the future by adding actuators 210 to provide solar tracking functionality. Though illustrated in FIGS. 5*a*-5*c* with a single drive aim cradle 224 similar to the one in the FIGS. 4*a*-4*c* embodiment, the FIG. 5*a*-5*c* embodiment may also be configured to use the butterfly cradle 223 illustrated in FIGS. 3*a*-3*c*. If this embodiment is configured with the butterfly cradle, a linkage 220 and motor 225 can be added to the structure (as shown in FIGS. 3*a*-3*c*) as a future upgrade to provide solar tracking functionality. In yet another alternative embodiment, the axis 201 of the cradle 223 may be removed altogether and the FIGS. 5*a*-5*c* embodiment may be configured with a fixed (nonmovable) cradle structure 224 connected to the foundation 204. Though this embodiment would not be upgradable to a solar tracker system, it would still provide the other advantageous structural features described herein.

Figure 6A:
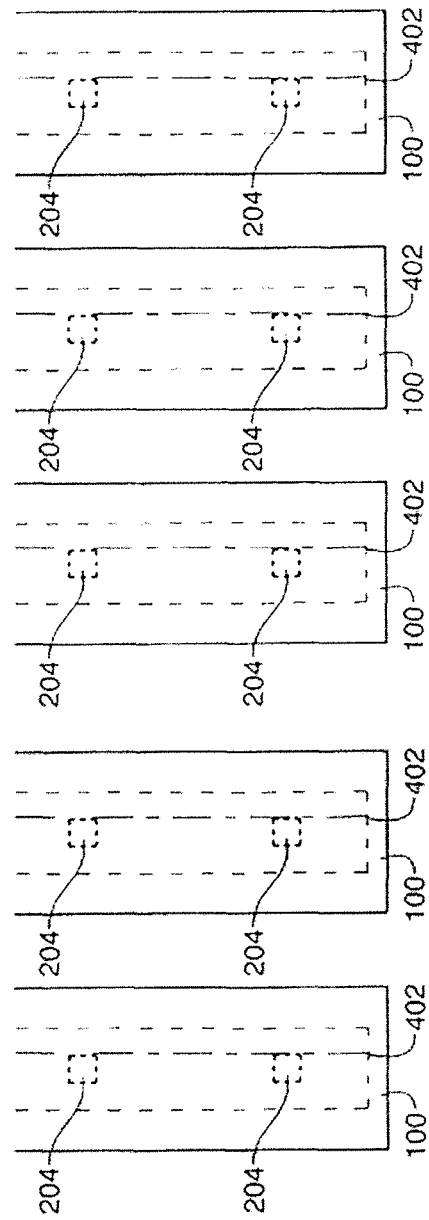
FIGS. 6a-6c illustrate top down and side views of a support system for a fixed axis solar panel array using a truss and cradle assembly in accordance with another embodiment described herein.
Figure 6B:
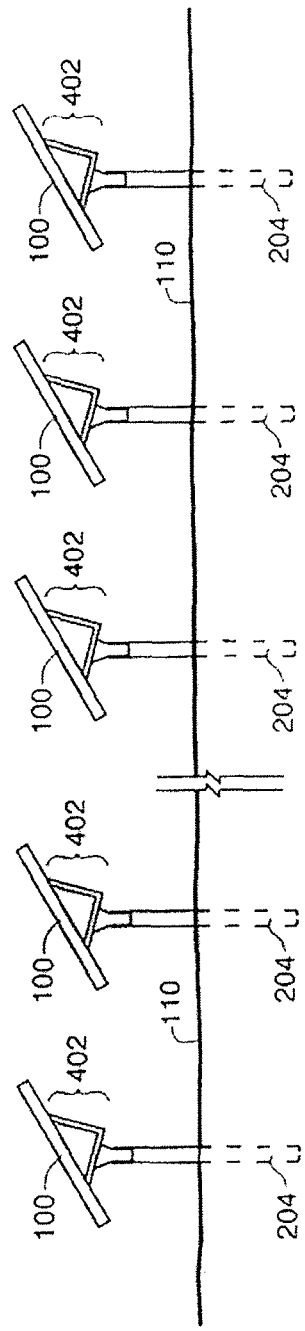
Figure 6C:
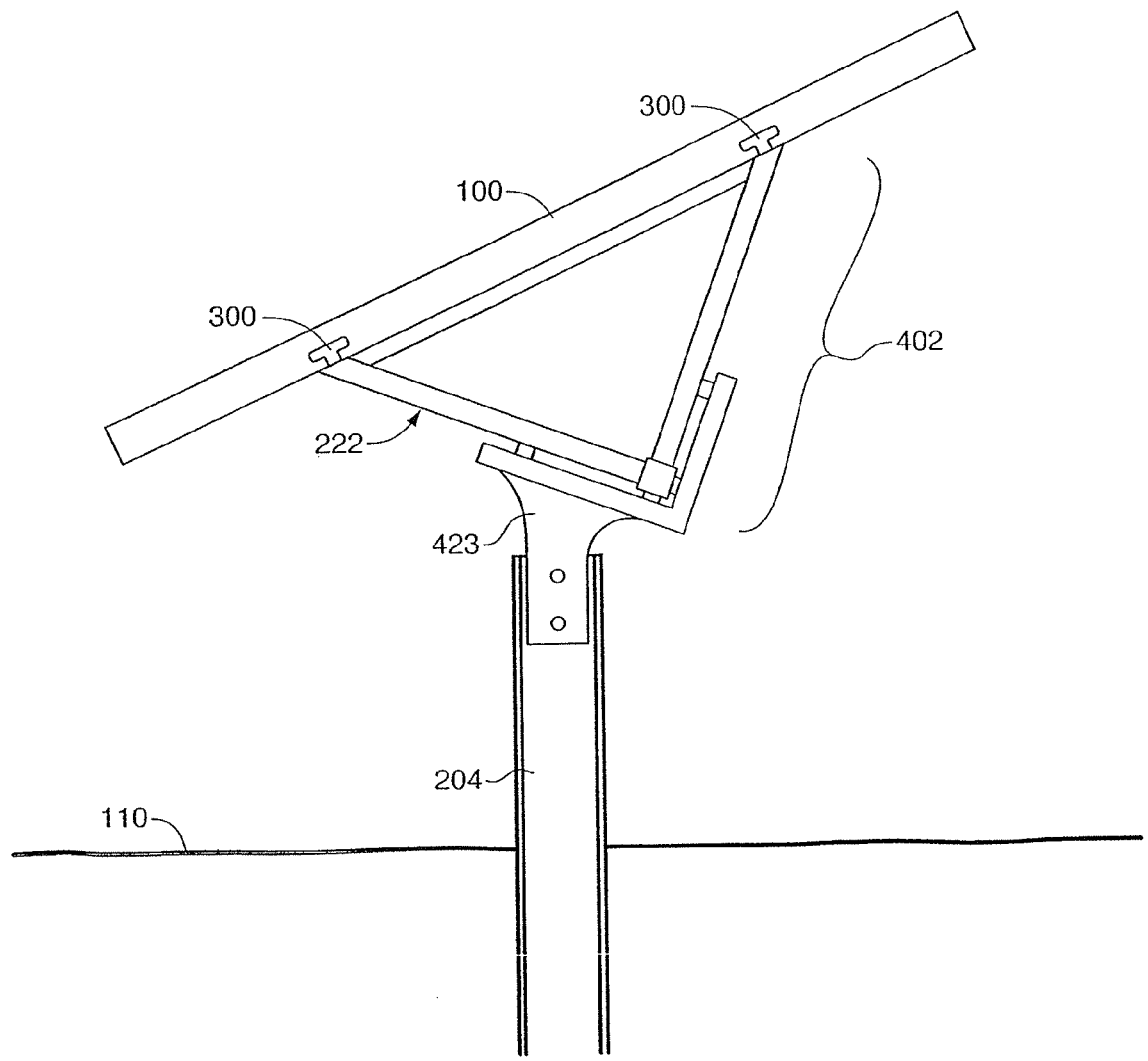

FIGS. 6a-6c illustrate another embodiment of a PV module support system utilizing a truss and cradle assembly. In the FIG. 6a-6c embodiment, the truss and cradle assembly is fixed in an angled position. In one example configuration, the lowest point of the PV module may be 18" above the ground or building structure such as a roof, and the PV module 100 may be angled at a 25 degree angle relative to the ground 111 or building structure. As with other embodiments, the use of a truss and cradle assembly 402 permits the use of long spans of adjacent PV modules 100, or longer PV modules 100, without requiring gaps 150 in the PV modules for supporting foundations 204. Additionally, the configuration of the truss and cradle assembly 402 with the cradle 423 holding the truss 222 at an angle off-center provides a low center of gravity and improved structural properties as compared to a system with a high connection point to the PV module. This, combined with the structural rigidity offered by the truss 222, allows the foundations 204 to be spaced further apart within a row of the PV module array.

Figure 7A:
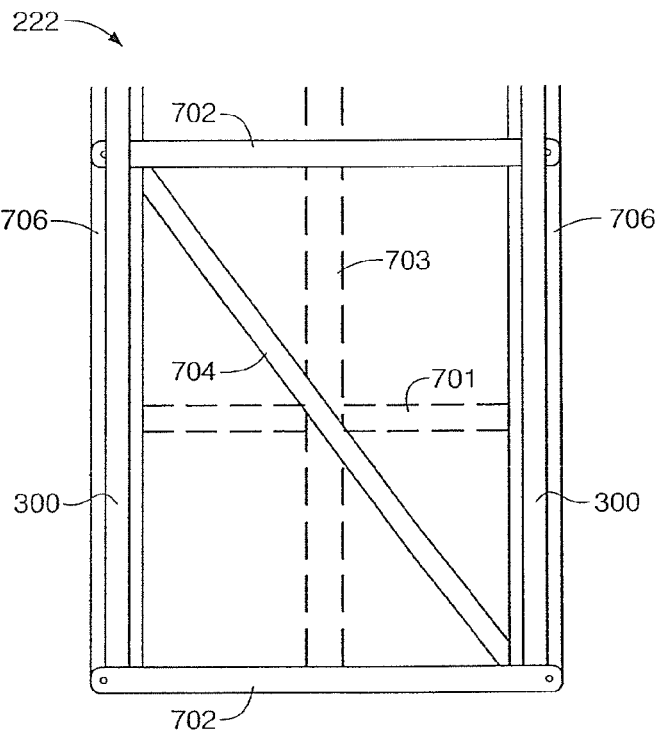
Figure 7B:
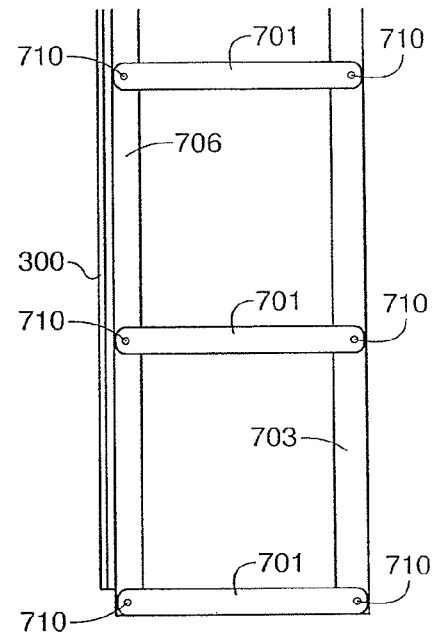
Figure 7C:
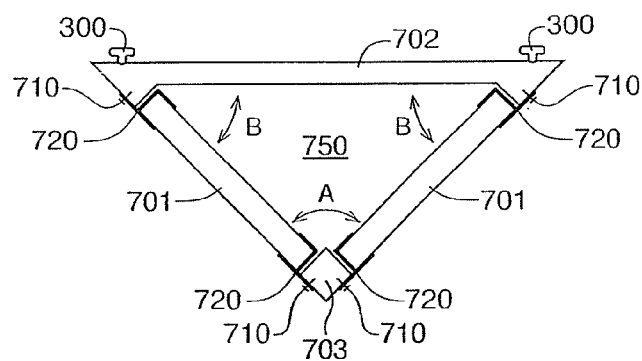

The embodiments described herein each include a triangular truss that spans the length of a row in the PV array. The truss 222 may be a fixed truss that is pre-assembled or assembled on-site, or may be a folding truss design. FIGS. 7a-7i illustrate top, side, and front views of an embodiment of a folding truss design. In FIGS. 7a-7c, the truss 222 is in an unfolded state. The top rails 706 are connected to a bottom box beam 703 via side supports 701 attached with pins 710 that provide pivot points. Top supports 702 and diagonal supports 704 are attached to the top rails 706 for additional support. The front view (FIG. 7c) illustrates the triangular truss shape formed by the folding truss design. The triangle truss 222 shown has angles of 90 degrees at angle A and 45 degrees at angles B, though the triangle truss could be in other configurations, such as an equilateral triangle with 60 degree angles A and B.

Various mechanisms may be used to hold the truss 222 in the unfolded state. For example, the bottom box beam 703 may have indents 750 at the point where each side support 701 will come to rest in the unfolded state. This is illustrated in FIGS. 7j and 7k, which show a top-down view of a segment of the bottom box beam 703 and side support 701. When the structure is unfolded and the side supports 701 are within the indents 750, the bottom box beam 703 will have a tendency not to move in either direction to fold, especially because the weight on the side supports 701 will generally be in a downward direction (towards the ground). When sufficient force is placed upon the bottom box beam 703 in a lateral direction, the side supports 701 will move out from the indents 750, as illustrated in FIG. 7k. Another way to fix the structure in the unfolded state is to add fixed cross beams to the unfolded structure that would prevent the folding action of the triangular truss 222. These can be added between adjacent side supports 710, between the top supports 702 and the bottom box rail 703, or to any two points that would prevent the folding action described below and depicted in FIGS. 7d-7i. Any suitable method of fixing the truss in the open state can be used to prevent folding of the truss 222.

Figure 7D:
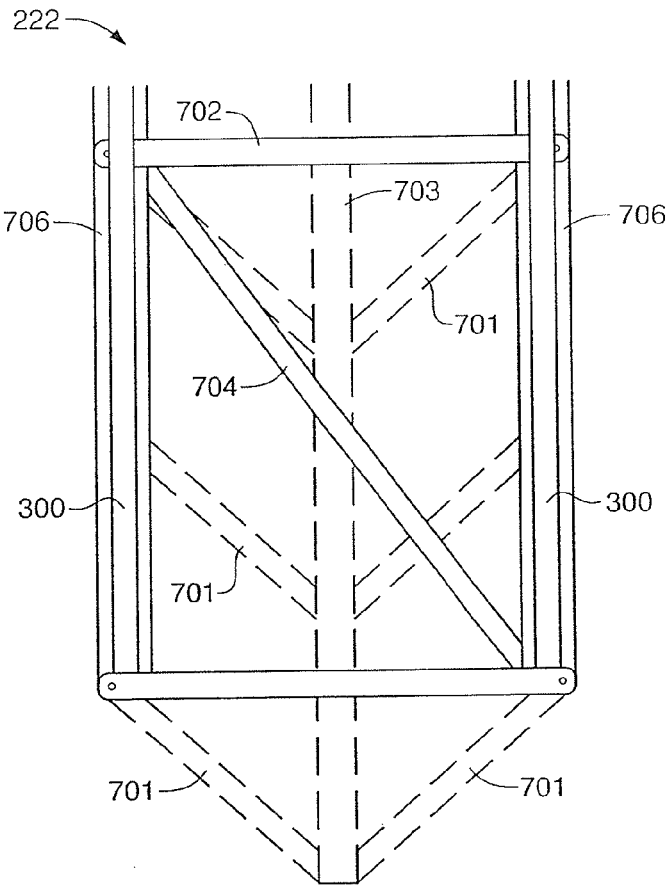
Figure 7E:
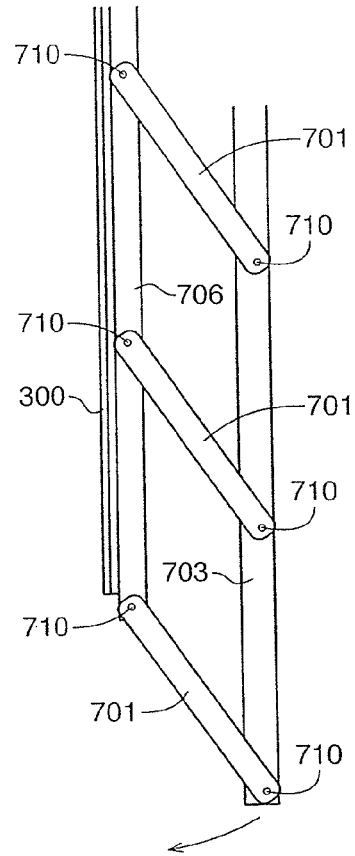
Figure 7F:
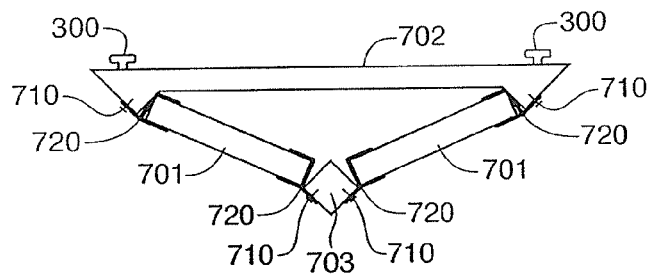
Figure 7J:
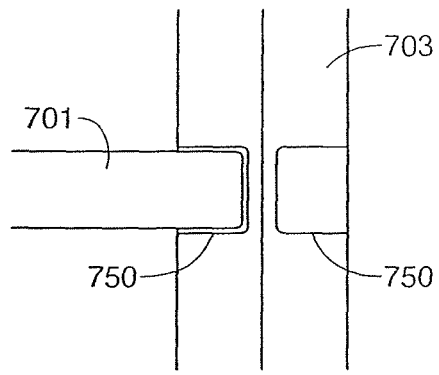
Figure 7K:
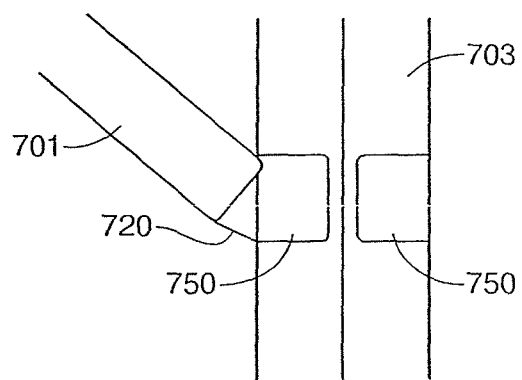

FIGS. 7d-7f illustrate the truss 222 as it is in the process of being folded. The bottom box beam 703 comes forward and up, and will fold in the indicated direction until it meets the top rails 702. The pins 710 on side supports 701 provide a rotation point, and hinges 720 allow necessary articulation for the bottom box beam 703 to move up and forward, towards the top rails 702.

FIGS. 7g-7i illustrate the truss 222 in a folded position. Here, the bottom box beam 703 rests against the top rails 702 of the triangular truss structure. The hinges 720 of the side supports 701 have folded to allow articulation of the bottom box beam 703, and the side supports 701 have fully pivoted about rotation points provided by pins 710. The folding truss 222 enables easy transportation and storage of the truss until it is commissioned for use in an installation. The folding truss 222 can be used in fixed PV module arrays or in solar tracker systems.

While embodiments have been described in detail, it should be readily understood that the invention is not limited to the disclosed embodiments. Rather the embodiments can be modified to incorporate any number of variations, alterations, substitutions, or equivalent arrangements not heretofore described without departing from the spirit and scope of the invention.

What is claimed as new and desired to be protected by Letters Patent of the United States is:

1. A support system for a solar panel comprising:
a triangular truss with connection areas for mounting at least one photovoltaic module thereon;
a cradle structure adapted to be supported on a first foundation and supporting the triangular truss, said cradle structure connected to at least two side supports of the triangular truss, wherein the cradle structure comprises:
a pair of drive arms extending from an axis and oriented with an angle of less than 180 degrees between them, said drive arms being connected to the triangular truss,
wherein a bias mechanism biases the axis in a predetermined position, and wherein the bias mechanism is a spring.

2. The system of claim 1, wherein the spring is in an axis assembly at the axis.

3. The system of claim 1, further comprising a pair of butterfly drive arms extending from the axis and oriented to one side of the pair of drive arms, the butterfly drive arms configured in a rigid position.

4. The system of claim 1, further comprising at least one photovoltaic module connected to the triangular truss.

5. The system of claim 4, further comprising a first and second installation rail connected to the triangular truss at the connection areas, wherein the installation rails slidingly engage with recesses in the at least one photovoltaic module.

6. The system of claim 4, wherein the at least one photovoltaic module is mounted on the triangular truss at the connection areas using clips, fasteners, screws, or glue.

7. The system of claim 1, further comprising a plurality of photovoltaic modules connected to the triangular truss.

8. The system of claim 7, wherein the plurality of photovoltaic modules are connected to the triangular truss without gaps between the plurality of photovoltaic modules.

9. The system of claim 7, further comprising a first and second installation rail connected to the triangular truss at the connection areas, wherein the installation rails slidingly engage with recesses in the plurality of photovoltaic modules, and the triangular truss structure is configured to support the plurality of photovoltaic modules.

10. A photovoltaic structure comprising:
at least one photovoltaic module;
a triangular truss with connection areas for mounting the at least one photovoltaic module thereon;
a plurality of cradle structures that support the triangular truss and are connected to at least two side supports of the triangular truss; and a plurality of foundations connected to each of the cradle structures, the foundations supporting the cradle structures above a surface;
wherein the cradle structures each comprise:
a pair of drive arms extending from an axis and oriented with an angle of less than 180 degrees between them, said drive arms being connected to the triangular truss,
wherein a bias mechanism biases the axis in a predetermined position, and wherein the bias mechanism is a spring.

11. The photovoltaic structure of claim 10, wherein the spring of each cradle structure is in an axis assembly at the axis of said cradle structure.

12. The photovoltaic structure of claim 10, further comprising a plurality of photovoltaic modules connected to the triangular truss.

13. The photovoltaic structure of claim 12, wherein the plurality of photovoltaic modules are connected to the triangular truss without gaps between the plurality of photovoltaic modules.

14. The photovoltaic structure of claim 12, wherein the plurality of photovoltaic modules are mounted on the triangular truss at the connection areas using clips, fasteners, screws, or glue.

15. The photovoltaic structure of claim 12, further comprising a first and second installation rail connected to the triangular truss at the connection areas, wherein the installation rails slidingly engage with recesses in the plurality of photovoltaic modules, and the triangular truss structure is configured to support the plurality of photovoltaic modules.

16. A solar panel array comprising,
a plurality of photovoltaic structures arranged adjacent one another, each photovoltaic structure comprising:
at least one photovoltaic module;
a triangular truss supporting the at least one photovoltaic module;
a plurality of cradle structures supporting the triangular truss and are connected to at least two side supports of the triangular truss; and
a plurality of foundations connected to each of the cradle structures, the foundations supporting the cradle structures above a surface,
wherein the cradle structures each comprise:
a pair of drive arms extending from an axis and oriented with an angle of less than 180 degrees between them, said drive arms being connected to the triangular truss,
wherein a bias mechanism biases the axis in a predetermined position, and wherein the bias mechanism is a spring.

17. The solar panel array of claim 16, wherein the spring of each cradle structure is in an axis assembly at the axis of said cradle structure.

* * * * *